Feb. 25, 1958          J. W. L. KÖHLER          2,824,433

METHOD OF SEPARATING GAS-MIXTURES IN A RECTIFYING COLUMN

Filed Dec. 10, 1952          3 Sheets-Sheet 1

INVENTOR.
JACOB W. L. KÖHLER

BY Fred M. Vogel

AGENT

Feb. 25, 1958  J. W. L. KÖHLER  2,824,433
METHOD OF SEPARATING GAS-MIXTURES IN A RECTIFYING COLUMN
Filed Dec. 10, 1952  3 Sheets-Sheet 2

INVENTOR
JACOB WILLEM LAURENS KÖHLER
BY
AGENT

Feb. 25, 1958 J. W. L. KÖHLER 2,824,433
METHOD OF SEPARATING GAS-MIXTURES IN A RECTIFYING COLUMN
Filed Dec. 10, 1952 3 Sheets-Sheet 3
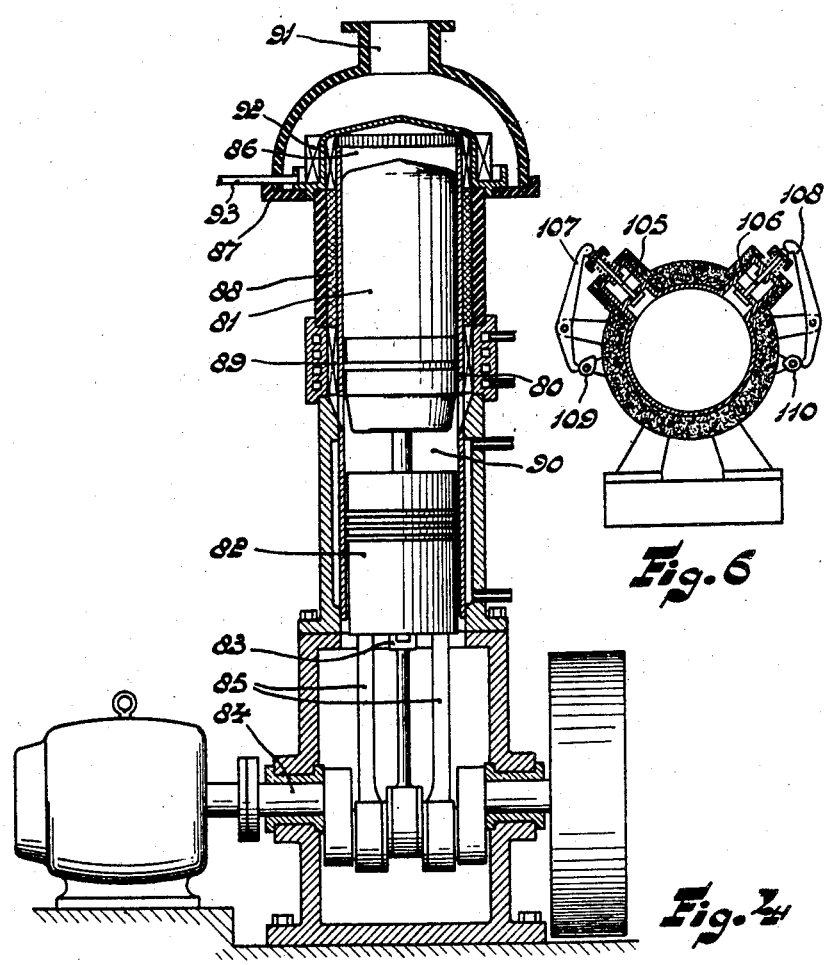
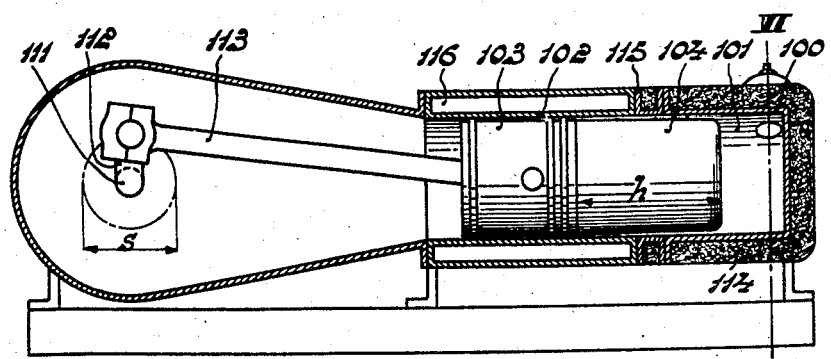

United States Patent Office 2,824,433
Patented Feb. 25, 1958

2,824,433

METHOD OF SEPARATING GAS-MIXTURES IN A RECTIFYING COLUMN

Jacob Willem Laurens Köhler, Eindhoven, Netherlands, assignor, by mesne assignments, to North American Philips Company, Inc., New York, N. Y., a corporation of Delaware Application December 10, 1952, Serial No. 325,102

Claims priority, application Netherlands February 29, 1952

11 Claims. (Cl. 62—175.5)

This invention relates to a method of separating gas-mixtures, for example air, into at least two fractions in a rectifying column comprising a vaporiser and a condenser.

Several methods are known for separating gas-mixtures into fractions of different volatilities. In the known methods the starting gas is constituted by, for example, air which is compressed up to a comparatively high pressure and cooled in a rectifying column by the liquid fraction having the highest boiling point, whereupon the air, after being decreased in pressure, is supplied at this lower pressure to a rectifying column. As a rule, use is made of the so-called double column. This rectifying column is constituted by two portions, viz. a high-pressure portion at a pressure of about 5 atms. and a low-pressure portion in which atmospheric pressure may prevail. The condenser of the high-pressure portion is the vaporiser of the low-pressure portion, the latter portion not requiring a condenser at its upper end. Said columns are used on a large scale in rectifying technique and are known as the double Linde column.

Although the said columns yielded very satisfactory results, they have the disadvantage of being complicated and occupying much space on account of their considerable height. A further disadvantage is that the gas-mixture to be fractionated must be compressed.

The use of a so-called half column (this is a column which is constituted by the lower portion of the double Linde column) has not been possible hitherto if the purity of the two fractions must satisfy high requirements, since the so-called half column permits of producing only pure oxygen and comparatively impure nitrogen. If the upper end of the half column is provided with a condenser by means of which the rising fraction, for example nitrogen, is condensed, it is possible to produce pure nitrogen, as is known from the rectifying technique, but at the same time impure oxygen only is obtained.

The object of the invention is to fractionate a gas-mixture, for example air, into two fractions having great purity in a rectifying column which operates under atmospheric pressure or substantially atmospheric pressure and which is much less complicated than the double columns used hitherto for this purpose, while the gas-mixture to be fractionated does not require compression in contradistinction to the conventional method.

According to the invention, provision is made of an auxiliary medium which is compressed in a compressor, the highest temperature occurring in the compression space of the compressor during normal operation being lower than 0° C., whereafter the compressed medium gives off caloric energy in the vaporizer of the rectifying column and, after being decreased in pressure, absorbs caloric energy in the condenser of the rectifying column, whereupon the medium flows back to the compressor, caloric energy also being extracted from the rectifying column by means of cold supplied by a cold-gas refrigerator.

When reference is made here to a cold-gas refrigerator, this is to be understood to mean a refrigerator comprising at least two spaces which continuously vary in volume with a substantially constant difference in phase and of which one has a lower temperature and the other has a higher temperature, which spaces communicate with one another by way of a freezer, a regenerator and a cooler and in which a gas of constant chemical composition traverses a closed thermodynamic cycle, it invariably being in the same state of aggregation. Such cold-gas refrigerators also include refrigerators operating on the reverse hot-gas motor principle.

It is mentioned that in installations for producing cold at low temperature it is known to utilise an auxiliary medium which is compressed and expanded. Such auxiliary media are used, for example, in the so-called cascade system. In this system as gas initially having a comparatively high temperature, for example room temperature, is compressed and subsequently cooled by heat-exchange with a gas of low temperature which has already expanded. Consequently, such installations comprise heat-exchangers for cooling the gas after compression. However, if, according to the invention, use is made of a compressor in which the highest temperature occurring in the compression space of the compressor during normal operation may be lower than 0° C., and more particularly if this temperature may be equal to the operating temperature of the medium and hence may be, for example, −45° C., the aforementioned heat-exchangers may be dispensed with.

The aforesaid compressor has been previously proposed. According to this proposal, the compressor is constructed in the form of a piston engine in which the distance between the edge of the piston constituting the transition with the substantially cylindrical part of the piston, of that working surface which acts upon the volume of the working space of the engine and the means for sealing the piston relatively to the wall of the cylinder is at least 0.8 times the stroke of the piston.

The present invention recognizes the fact that such a compressor may successfully be used in rectifying installations, whereby a material simplification of the installation is obtainable. It is now possible by the use of this compressor to cause a medium to traverse a cycle, whereby in the vaporiser of the column, which is preferably in the form of a single column to which the gas-mixture to be fractionated, more particularly air, is supplied at atmospheric pressure or substantially atmospheric pressure, heat of evaporation is supplied by the said medium to the fraction locally available. This results in at least part of this fraction being vaporised, which is necessary for the operation of the column. The auxiliary medium is subsequently decreased in pressure, thus extracting cold in the condenser of the column, whereafter it is carried off from the vaporiser at, for example, a temperature of −200° C. to be supplied, if desired after being overheated, to the compressor in which the medium is compressed again. For thermodynamic reasons it has been found necessary to extract further cold from the column, for which purpose use is made, according to the invention, of the cold-gas refrigerator.

The method according to the invention may be used more particularly if it is desirable that the fractions separated in the rectifying column should be in the gaseous state.

In order that the invention may be readily carried into effect, it will now be described with reference to the accompanying drawings illustrating, by way of example, some methods and installations according thereto.

Fig. 4 shows a cold-gas refrigerator such as used in the installations shown in Figs. 1, 2 and 3, and Figs. 5 and 6 show one embodiment of the compressor.

Figure 1:
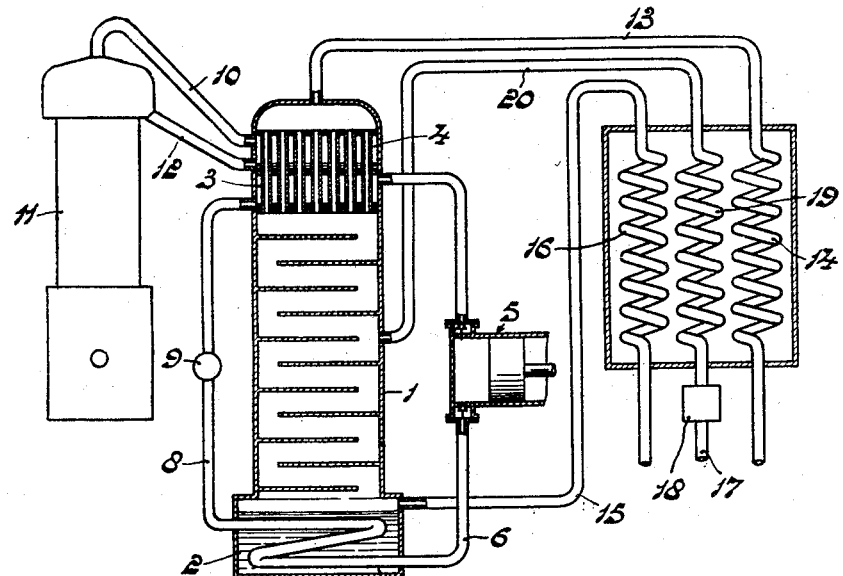
Fig. 1 shows an installation in which air is fractionated and the fractions are in the gaseous state.

The installation shown in Fig. 1 is constituted by a rectifying column 1, comprising a vaporiser 2 and a condenser which is constituted by two halves 3 and 4. The installation furthermore comprises a compressor 5, the construction of which will be described with reference to Figs. 5 and 6. The compressor comprises a conduit 6, which is connected to a heat-exchanger 7 provided in the vaporiser 2 of the column. The heat-exchanger 7 is connected to a conduit 8, which comprises a reducing valve 9 and which is connected to the condenser portion 3 of the column. The portion 4 of the condenser comprises a conduit 10, which is connected to a cold-gas refrigerator 11, a second conduit 12 thereof leading back to the portion 4 of the condenser. The column is provided, at its upper end, with a conduit 13 including a heat-exchanger 14. The lower end of the column comprises a conduit 15 including a heat-exchanger 16. The gas-mixture to be fractionated is supplied to the column by way of a conduit 17, which may include a small pump 18, a heat-exchanger 19 and a conduit 20.

The operation of the installation is as follows. The gas-mixture to be fractionated, for example air, is supplied at atmospheric pressure or substantially atmospheric pressure, the pump 18 providing a difference in pressure sufficient to make the gas-mixture flow towards the column. In the heat-exchanger 19 the mixture to be fractionated is in heat-exchanging contact with the fractions carried off from the column. After thus being decreased in temperature, the gas-mixture flows through the conduit 20 to the column in which it is fractionated. The fraction having the highest boiling point, for example oxygen, is received in the vaporiser in which it vaporises again as a result of caloric energy being supplied by the auxiliary medium of compressor 5, a portion of the resultant pure gaseous oxygen being carried off through the conduit 15 and the heat-exchanger 16. Nitrogen is present on the cold side of the column. Caloric energy is extracted from this nitrogen in the portions 3 and 4 of the condenser, part of the nitrogen being carried off in the gaseous state through the conduit 13 and the heat-exchanger 14.

The medium contained in the compressor 5, preferably nitrogen, is compressed in the compressor, flows through the heat-exchanger 7, in which it causes the oxygen to be vaporised, is subsequently decreased in pressure by means of the reducing valve 9 and then flows to the portion 3 of the condenser, in which it extracts caloric energy from the nitrogen, whereupon the medium still at very low temperature flows back to the compressor 5 to be compressed again.

However, for thermodynamic reasons it is necessary to extract additional caloric energy from the column. This takes place in the portion 4 of the condenser, which contains an auxiliary medium which may likewise be, for example, nitrogen. This nitrogen is allowed to vaporise in the said condenser portion, whereafter the nitrogen vapour is supplied through conduit 10 to the freezer of the cold-gas refrigerator 11, in which it is condensed and supplied again as a liquid nitrogen through conduit 12 to the portion 4 of the condenser. The construction of the cold-gas refrigerator is clarified in Fig. 4.

Figure 2:
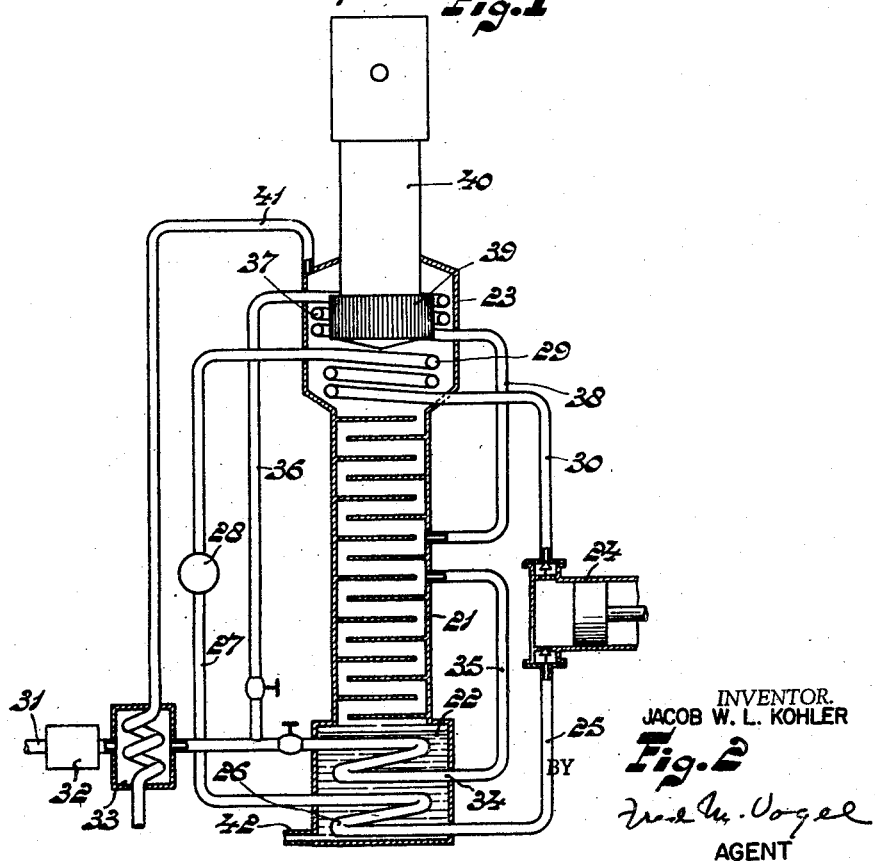
Fig. 2 shows an installation in which the fractions are in the liquid state, while in the installation shown in Fig. 3 a third fraction, for example argon, is effected.

The installation shown in Fig. 2 comprises a column 21 having a vaporiser portion 22 and a condenser portion 23. The installation comprises, similarly as in the previous installations, a compressor 24, which causes an auxiliary medium to accomplish a cycle through a conduit 25, a heat-exchanger 26, a conduit 27, which may include a reducing device 28, a heat-exchanger 29 and a conduit 30. The gas-mixture to be fractionated is supplied via a conduit 31, which may include a small pump 32 and a heat-exchanger 33, a heat-exchanger 34 and a conduit 35 to the column in which it is fractionated. A second portion of the gas-mixture to be fractionated is supplied through a conduit 36, a heat-exchanger 37 and a conduit 38 to the column in which this portion is likewise fractionated. The condenser 23 includes a freezer 39 of a refrigerator 40, so that the nitrogen can condense on the freezer of this refrigerator. The condenser furthermore comprises a conduit 41 for the discharge of the gaseous nitrogen evolved. This nitrogen in the heat-exchanger is in heat-exchanging contact with the air to be fractionated. The vaporiser 22 is provided with a discharge conduit 42 for the liquid oxygen.

The operation of this installation substantially corresponds to that of the installation shown in Fig. 1. The auxiliary medium, for example nitrogen, which is compressed in the compressor 24, flows through the heat-exchanger 26, giving off caloric energy to the fraction having the highest boiling point in the vaporizer 22, flows through the conduit 27 in which it is decreased in pressure by the reducing device 28, flows through the heat-exchanger 29, extracting caloric energy from the fraction having the lowest boiling point, whereupon the medium flows back to the compressor 24.

The gas-mixture to be fractionated is supplied through the conduit 31 and cooled in the heat-exchanger 33, whereafter a portion is cooled further in the heat-exchanger 34 by the fraction having the highest boiling point. Consequently, at the same time caloric energy is supplied to this fraction, which thus vaporises at least in part, whereupon the gas-mixture to be fractionated flows through conduit 35 to the column 21, in which it is fractionated. A further portion of the gas-mixture to be fractionated flows through conduit 36 to the heat-exchanger 37, which surrounds freezer 39 of the cold-gas refrigerator 40 and in which it is decreased in temperature, whereafter it flows through conduit 36 back to the column. Caloric energy is extracted from the condenser not only by the auxiliary medium of the compressor, but also by the cold-gas refrigerator. Caloric energy is extracted in the condenser from the fraction having the lowest boiling point, for example nitrogen. The gaseous nitrogen is discharged through conduit 41 and heat-exchanger 33. Liquid oxygen is tapped from the vaporiser through conduit 42.

Figure 3:
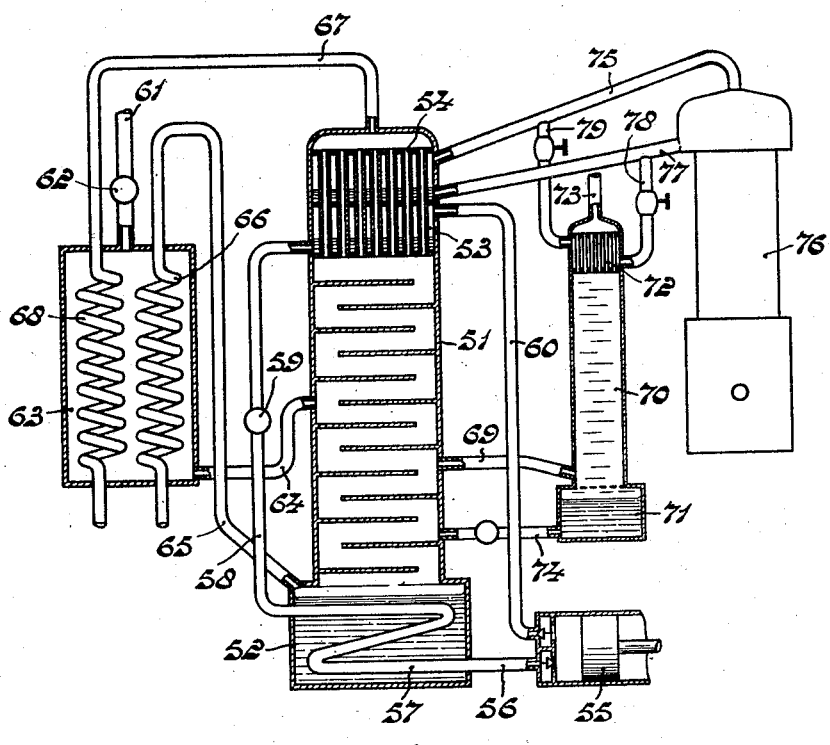

The installation shown in Fig. 3 may be utilised if a third fraction is to be made. If the gas-mixture to be fractionated is air, the third fraction may be, for example, argon.

The installation comprises a single rectifying column 51, which may include a vaporiser and a condenser constituted by two parts 53 and 54. Similarly as in the installation above described, the installation shown in Fig. 3 comprises a compressor 55, which causes an auxiliary medium, for example nitrogen or oxygen or another medium suitable for the purpose to accomplish a cycle through a conduit 56, a heat-exchanger 57, a conduit 58, which may include a reducing device 59, the portion 53 of the condenser and a conduit 60. The gas-mixture to be fractionated is supplied to the column via a conduit 61, which includes a small pump 62, a space 63 serving as the heat-exchanger and a conduit 64. The fraction having the highest boiling point is discharged in the gaseous state from the vaporiser 52 through a conduit 65 and a cooling spiral 66, the fraction at the upper end of the column being discharged by way of a conduit 67 including a cooling spiral 68. At an area in the column at which the percentage of argon is sufficiently large, the gas-mixture which is locally available and which consists of oxygen and argon is supplied through a conduit 69 to a column 70, which comprises a vaporiser 71 at its lower end and a heat-exchanger 72 at its upper end. The argon developed in the column escapes through a conduit 73, while the liquid oxygen received in the vaporiser through a conduit 74 which includes a small pump is supplied back to the column 51.

The portion 54 of the condenser communicates by way of a conduit 75 and also by way of a conduit 77 with a cold-gas refrigerator 76. The condenser and the conduit 75 contain an auxiliary medium, for example nitrogen, which extracts heat from the column in the condenser portion and thus vaporises, the nitrogen vapour being supplied through a conduit 77 to the cold-gas refrigerator in which the nitrogen is condensed by means of cold supplied by the refrigerator. The conduits 75 and 77 each have a tapping 78, 79 respectively, through which the heat-exchanger 72 is coupled to this conduit system, so that liquid nitrogen can also vaporise in heat-exchanger 72, whereas the gaseous nitrogen is supplied back to the cold-gas refrigerator.

In the above-mentioned embodiments air is fractionated. However, according to the methods above described, it is alternatively possible to fractionate other gas-mixtures, for example coke-oven gas. The column 51 in Fig. 3 is a column with dishes, whereas the column 70 may be a so-called "packed column."

Fig. 4 shows the cold-gas refrigerator, which comprises a cylinder 80, in which a displacer 81 and a piston 82 are adapted to reciprocate with a constant phase difference. The displacer 81 is coupled by way of a driving-rod system 83 to a crank of a crank-shaft 84, while a piston 82 is coupled by way of driving rods 85 to cranks of the same crank-shaft. A space 86 above the displacer is the so-called cold space, which communicates by way of a freezer 87, a regenerator 88 and a cooler 89 with a space 90 between the piston and the displacer. The latter space is the so-called cooled space. As described above, a medium in the gaseous state is supplied through a conduit 91 and condenses on fins 92 of the freezer, the condensate being discharged through a conduit 93.

Figs. 5 and 6 show an embodiment of the compressor used in the above-described method, Fig. 6 being a sectional view taken along the line VI—VI of Fig. 5. This compressor comprises a cylinder having a portion 100, which embraces a compression space 101 of the compressor. The cylinder furthermore comprises a portion 102, in which a piston 103 is adapted to reciprocate. The piston 103 is provided with a cap 104, the height $h$ of which is at least 0.8 times the stroke $S$ of the engine, for example 1.5 times this stroke. Fig. 6 shows that the portion 100 of the cylinder by which the compression space is bounded comprises two valves, viz. an inlet valve 105 and an outlet valve 106. The valves may be opened and closed in known manner by way of tumblers 107, 108 and cams 109, 110 respectively. The movement of the cams is likewise derived in known manner from the movement of a crank-shaft 111. The crank-shaft comprises a crank 112, which is connected by way of a driving rod 113 to the piston of the engine. The compression space 101 is insulated by means of an insulating layer 114. Between the portions 100 and 102 of the cylinder is provided a portion 115, which has a coefficient of thermal conductivity smaller than 0.1 cal./cm. sec. °C. and which is made, from for example V$_2$A-steel. The portion 102 of the cylinder is heated by way of a water jacket 116. The compressor may be driven by means of an electric motor (not shown).

What I claim is:

1. A method of separating gas mixtures into at least two fractions in a system having a rectifying column, a vaporizer, condenser, and compressor comprising the steps of providing an auxiliary medium in said system, compressing said auxiliary medium in a compressor wherein the highest temperature occurring in the compression space of the compressor during normal operations is lower than 0° C., passing said compressed medium through said vaporizer in the rectifying column where said medium gives off caloric energy, decreasing the pressure of said medium, conducting said medium through said condenser in the rectifying column thereby absorbing caloric energy, causing said medium to flow back to said compressor, and additionally extracting caloric energy from said rectifying column by means of cold extracted from a cold-gas refrigerator, comprising a cylinder, two pistons operating in said cylinder with a constant phase difference and defining two chambers in which a closed thermodynamic cycle is performed by a gaseous medium of invariable chemical composition in one and the same state of aggregation, the volume of gaseous medium in said chambers varying continuously while one of said chambers has a low temperature and the other chamber has a higher temperature, the chambers being connected with one another through a cooler, regenerator and freezer, said cycle being performed independently of said fractionating process.

2. A method of separating gas mixtures into at least two fractions as set forth in claim 1 wherein said gas mixture to be fractionated is supplied to a single column rectifying column at substantially atmospheric pressure.

3. A method of separating gas mixtures into at least two fractions as set forth in claim 1 wherein the fractions are in the gaseous state.

4. A method of separating gas mixtures into at least two fractions as set forth in claim 1 wherein the gas mixture to be fractionated is cooled by means of cold supplied by the liquid fraction having the highest boiling point.

5. A method of separating gas mixtures into at least two fractions as set forth in claim 1 wherein said gas mixture to be fractionated is cooled by means of cold supplied by the liquid fraction having the highest boiling point and also cooled by means of cold supplied by the auxiliary medium.

6. A method of separating gas mixtures into at least two fractions as set forth in claim 1 wherein the gas mixture to be fractionated is cooled by means of cold supplied by a cold-gas refrigerator.

7. A method of separating gas mixtures into at least two fractions as set forth in claim 1 wherein at least part of the gas mixture is cooled by means of cold supplied by the liquid fraction having the highest boiling point and another part is cooled by means of cold supplied by a cold-gas refrigerator.

8. A method of separating gas mixtures into at least two fractions as set forth in claim 1 wherein at least a component of said gas mixture is used as an auxiliary medium.

9. A method of separating gas mixtures into at least three fractions in a system having a rectifying column, a vaporizer, condenser, and compressor comprising the steps of providing an auxiliary medium in said system, compressing said auxiliary medium in a compressor wherein the highest temperature occurring in the compression space of the compressor during normal operations is lower than 0° C., passing said compressed medium through said vaporizer in the rectifying column where said medium gives off caloric energy, decreasing the pressure of said medium, conducting said medium through said condenser in the rectifying column thereby absorbing caloric energy, causing said medium to flow back to said compressor, additionally extracting caloric energy from said rectifying column by means of cold extracted from a cold-gas refrigerator, and one of said fractions being discharged from said column and fractionated in a second column, said fraction being discharged on the cold side of said second column while caloric energy is extracted from this column by means of cold supplied by a cold-gas refrigerator.

10. A method of separating gas mixtures into at least three fractions as set forth in claim 8 wherein one of said fractions is discharged from said column and fractionated in a second column, said fraction being discharged on the cold side of said second column while caloric energy is extracted by means of cold supplied by the cold-gas refrigerator.

11. A device for separating gas mixtures in a rectifying column comprising a cold-gas refrigerator of the piston-reciprocating type for extracting caloric energy from said column, a piston compressor having a medium therein and means communicating with said compressor for causing one of said gases in the column to be vaporized and additionally extracting caloric energy from said column, the piston of said compressor being provided with a cap having a height which is at least 0.8 times the stroke of the piston of said compressor.

References Cited in the file of this patent

UNITED STATES PATENTS

| | | |
|---|---|---|
| 713,367 | Wallmann | Nov. 11, 1902 |
| 1,245,644 | Ver Planck | Nov. 6, 1917 |
| 1,251,043 | Kaemmerling | Dec. 25, 1917 |
| 1,616,391 | Prouty | Feb. 1, 1927 |
| 1,879,563 | Smith | Sept. 27, 1932 |
| 2,011,964 | Ajam | Aug. 20, 1935 |
| 2,040,112 | Van Nuys | May 12, 1936 |
| 2,217,192 | Wuehr | Oct. 8, 1940 |
| 2,270,904 | Rutishauser | Jan. 27, 1942 |
| 2,284,662 | Kahle | June 2, 1942 |
| 2,408,710 | Van Nuys | Oct. 1, 1946 |
| 2,409,459 | Van Nuys | Oct. 15, 1946 |
| 2,411,711 | De Baufre | Nov. 26, 1946 |
| 2,424,201 | Van Nuys | July 15, 1947 |
| 2,482,304 | Van Nuys | Sept. 20, 1949 |
| 2,534,274 | Kniel | Dec. 19, 1950 |
| 2,567,461 | Aicher | Sept. 11, 1951 |
| 2,600,110 | Hachmuth | June 10, 1952 |
| 2,700,282 | Roberts | Jan. 25, 1955 |

FOREIGN PATENTS

| | | |
|---|---|---|
| 876,651 | France | Nov. 12, 1942 |
| 680,373 | Great Britain | Oct. 1, 1952 |